US 6,712,169 B2

(12) United States Patent
Ryan et al.

(10) Patent No.: US 6,712,169 B2
(45) Date of Patent: Mar. 30, 2004

(54) DISPLACEABLE AUTOMOTIVE HOOD ASSEMBLY

(75) Inventors: Shawn Gregory Ryan, Dayton, OH (US); Conrad Oehlerking, Meine (DE); Ruprecht Sinnuber, Gifhorn (DE); Matthew A Ault, Ortonville, MI (US)

(73) Assignees: Delphi Technologies, Inc., Troy, MI (US); Volkswagen, AG (DE)

( * ) Notice: Subject to any disclaimer, the term of this patent is extended or adjusted under 35 U.S.C. 154(b) by 0 days.

(21) Appl. No.: 10/150,130

(22) Filed: May 16, 2002

(65) Prior Publication Data

US 2003/0213635 A1 Nov. 20, 2003

(51) Int. Cl.[7] .............................................. B60R 21/34
(52) U.S. Cl. ...................................................... 180/274
(58) Field of Search ............................ 180/274, 69.21, 180/69.2; 280/730.1; 411/378, 409, 383, 384, 392, 544; 403/270–272, 278, 285; 296/188

(56) References Cited

U.S. PATENT DOCUMENTS

| 2,854,281 A | 9/1958 | Cassin ........................... 296/84 |
| 3,037,809 A | 6/1962 | Praha ........................... 296/84 |
| 3,650,542 A | 3/1972 | Shimano et al. ......... 280/150 B |
| 4,015,870 A | 4/1977 | Stcherbatcheff et al. ....... 293/32 |
| 4,171,140 A | 10/1979 | Toshihisa .................... 280/749 |
| 4,249,632 A | 2/1981 | Lucchini et al. ............. 180/274 |
| 5,090,729 A | 2/1992 | Watanabe ................... 280/743 |
| 5,232,244 A | 8/1993 | Itoh ............................ 280/749 |
| 5,439,247 A | 8/1995 | Kolb .......................... 280/730 |
| 5,653,464 A | 8/1997 | Breed et al. ................. 280/743 |
| 5,931,498 A | 8/1999 | Keshavaraj ............... 280/743.1 |
| 5,934,743 A | 8/1999 | Nohr et al. .................. 296/188 |
| 6,019,390 A | 2/2000 | Keshavaraj ............... 280/743.1 |
| 6,182,782 B1 * | 2/2001 | Matsuura et al. ........... 180/274 |
| 6,293,362 B1 * | 9/2001 | Sasaki et al. ............... 180/274 |
| 6,386,623 B1 | 5/2002 | Ryan et al. |
| 6,467,563 B1 * | 10/2002 | Ryan et al. .................. 180/274 |
| 6,474,679 B2 * | 11/2002 | Miyasaka et al. ........ 280/730.1 |
| 6,513,617 B2 * | 2/2003 | Sasaki et al. ............... 180/274 |
| 6,530,449 B2 * | 3/2003 | Sasaki et al. ............... 180/274 |
| 6,543,086 B2 * | 4/2003 | Bjureblad et al. ............ 16/222 |

FOREIGN PATENT DOCUMENTS

| DE | 27 11 338 A1 | 9/1978 |
| DE | 197 45 873 A1 | 4/1999 |
| JP | 07108903 | 4/1995 |
| JP | 07156749 | 6/1995 |
| JP | 10315908 | 2/1998 |
| JP | 10152018 | 6/1998 |
| JP | 10217903 | 8/1998 |

* cited by examiner

*Primary Examiner*—Thomas Price
(74) *Attorney, Agent, or Firm*—Scott A. McBain

(57) ABSTRACT

An automobile hood assembly for disposition in overlying relation to a vehicle storage compartment in an automotive vehicle. The hood assembly includes an exterior show surface member, a support frame at a position below the exterior show surface member and at least one extensible tether element operatively connecting the exterior show surface member and the support frame. At least one inflatable air bag cushion is housed intermediate the support frame and the exterior show surface member. Upon introduction of inflation gas the inflatable air bag cushion is inflatable to an expanded profile forcing at least a portion of the exterior show surface member away from the support frame to define an energy absorbing impact surface.

21 Claims, 4 Drawing Sheets

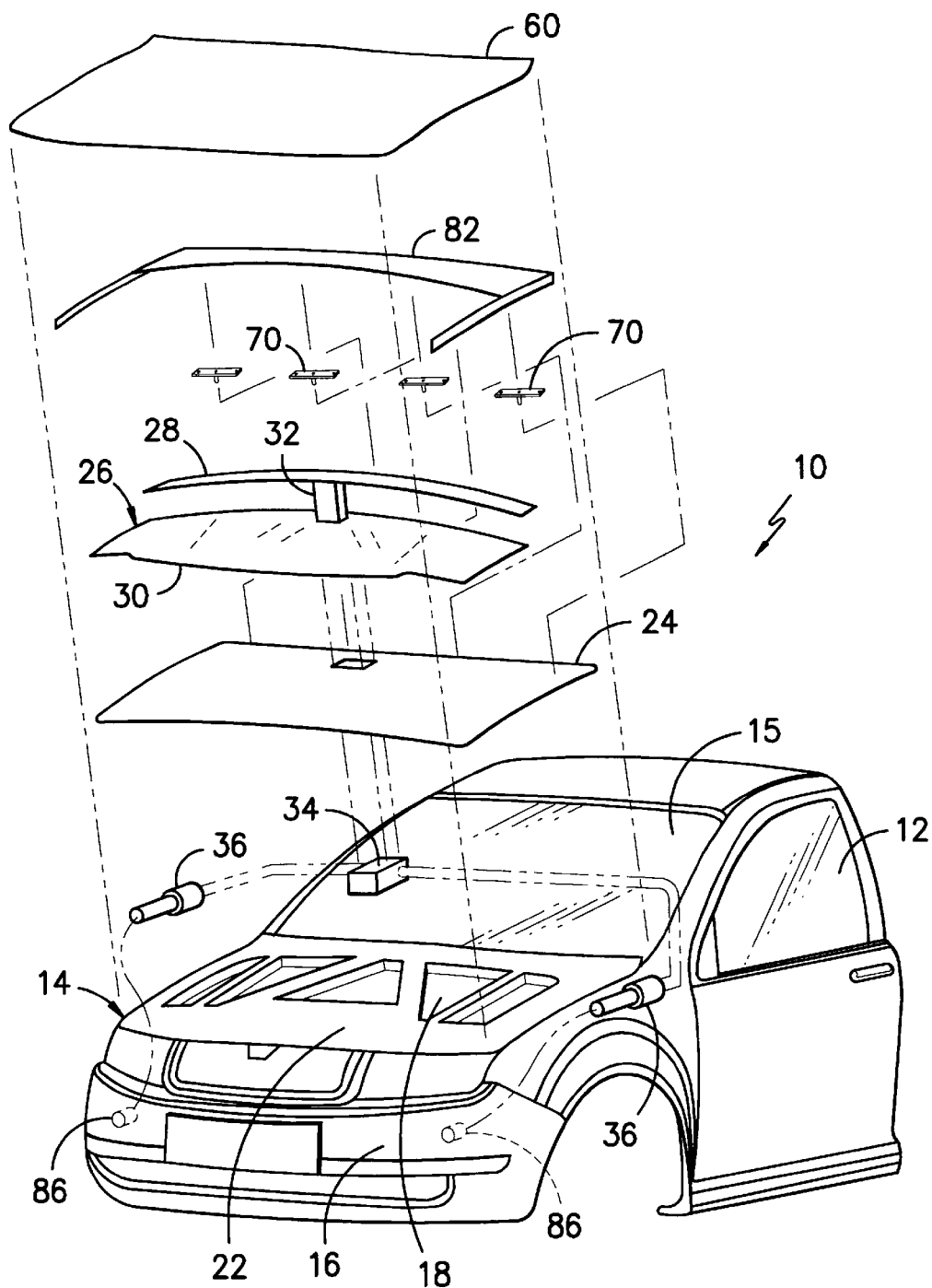
FIG. -1-

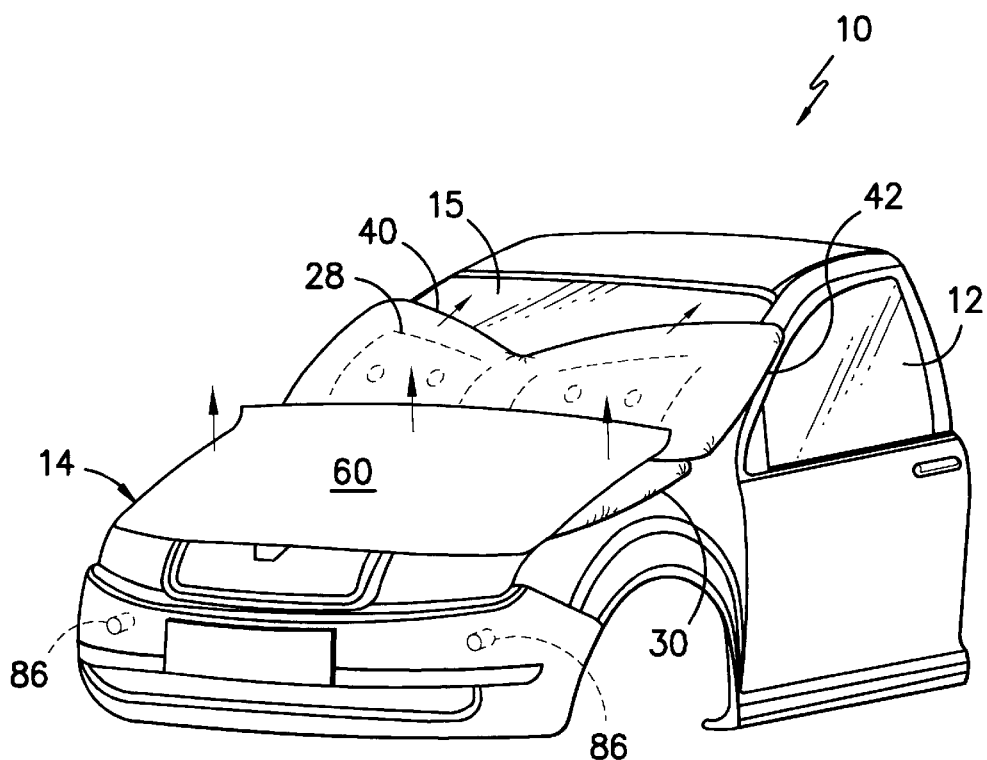
FIG. -2-

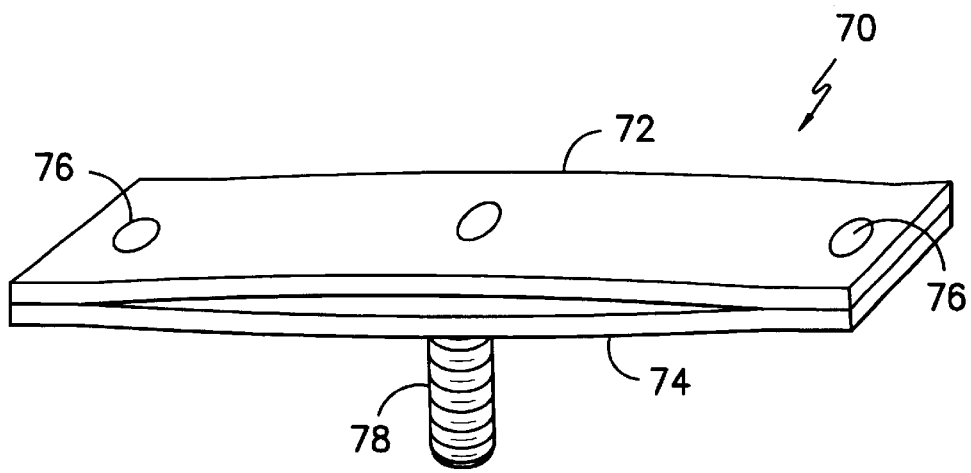
FIG. -3-
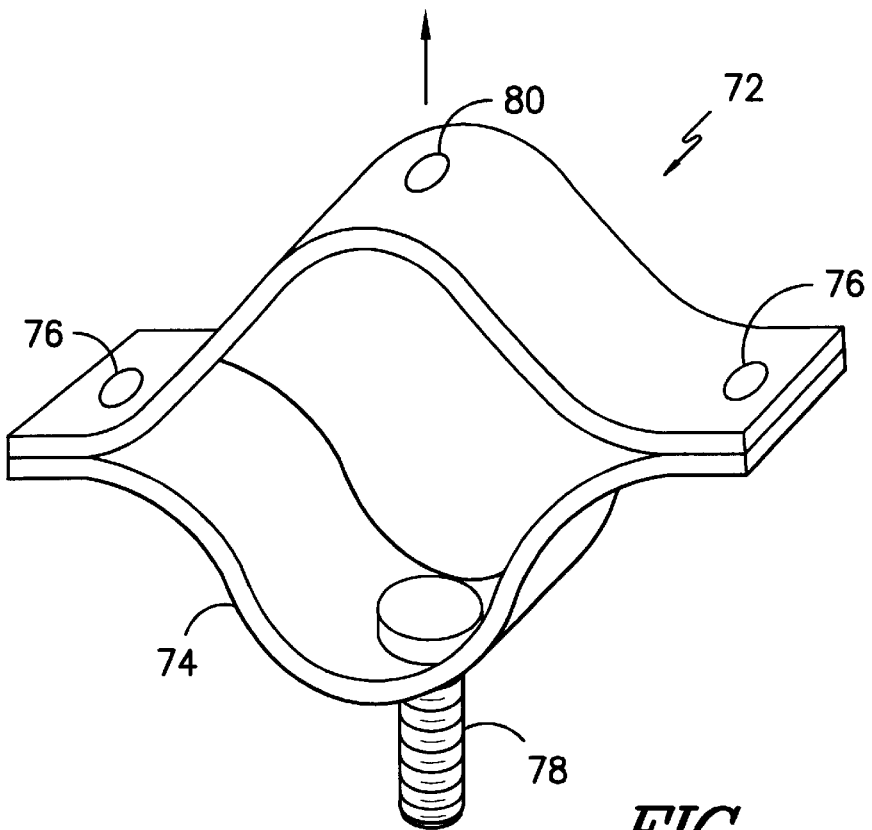
FIG. -4-

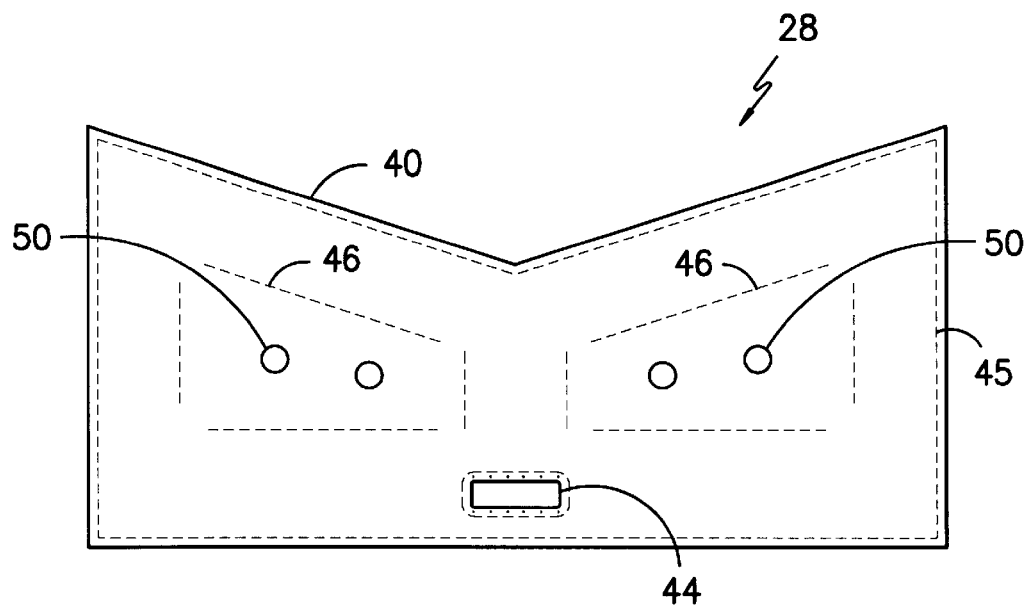
FIG. -5-
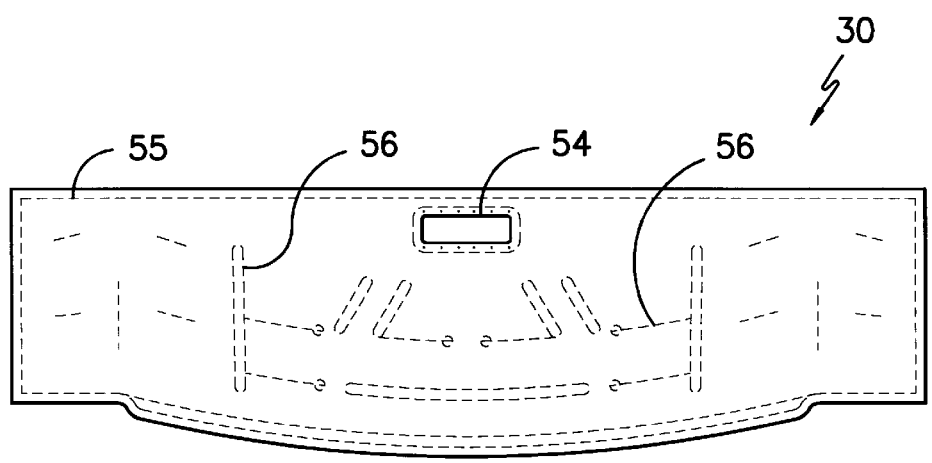
FIG. -6-

DISPLACEABLE AUTOMOTIVE HOOD ASSEMBLY

TECHNICAL FIELD

This invention relates to a hood assembly for use in an automotive vehicle, and more particularly to a hood assembly incorporating inflatable elements for expansion during an impact event.

BACKGROUND OF THE INVENTION

It is well known in motor vehicles to utilize a hingeable hood disposed in the region between the passenger compartment and the forward bumper of the vehicle. Such hood structures may be opened so as to permit access to an underlying compartment which may store the engine of the vehicle in vehicles incorporating a forward engine design or a luggage storage compartment in vehicles which incorporate a rear engine design. The hood portion of the vehicle is typically formed from a relatively thin sheet of metal such as thin gauge steel which may be molded to the appropriate contour corresponding to the overall vehicle body design. The exterior of the hood portion which constitutes the show surface thereof is typically coated with one or more coats of primer and paint for enhancing both the aesthetic character and the corrosion resistance of the underlying material. Due to the relatively thin nature of the material forming the hood portion, a support structure such as a contoured plate with stamped rib supports typically extends across the underside of the hood portion so as to provide a degree of dimensional stability to the structure.

In the event of a collision, it may be desirable for the hood to have the ability to absorb energy thereby dissipating the force to which persons involved in the collision event may otherwise be subjected. The desirability of such energy absorbing character may be particularly important if the collision involves direct contact between the hood and a pedestrian, bicycle operator, motorcycle operator, or other persons at the exterior of the vehicle. During such a collision event, it is believed that substantially fixed elements underlying the hood such as batteries, engine components and the like may give rise to hard surfaces across the expanse of the hood which may resist deformation and corresponding energy absorption. In addition, structural elements peripheral to the hood such as fenders and the so called "scuttle area" immediately below the windshield may also provide relatively poor energy absorption.

In the past it has been proposed to displace impact regions of the hood away from underlying structures by the introduction of a high pressure gas beneath the impact surface of the hood. One such structure is illustrated and described in U.S. Pat. No. 5,934,743 to Nohr et al. the contents of which are incorporated by reference as is fully set forth herein.

SUMMARY OF THE INVENTION

This invention provides advantages and alternatives over the prior art by providing an automotive hood assembly which incorporates an arrangement of one or more inflatable gas receiving cushions disposed in underlying relation to the exterior of the hood assembly and which are expansible to an inflated condition to force the exterior surface outwardly to an impact absorbing configuration. The inflatable gas receiving cushions may be configured to extend outboard from beneath the hood exterior upon inflation so as to provide a cushioned covering relation across exterior portions of the vehicle including portions of the windshield, the scuttle area directly beneath the windshield and side fenders. The displacement of the outer portion of the hood assembly is preferably limited by an arrangement of extensible tethering elements.

These advantages are accomplished in a potentially preferred form of the invention by providing an automobile hood which extends in a region between the passenger compartment and a forward bumper of the automobile. The automobile hood assembly includes a relatively thin deformable exterior defining an outer show surface and an underlying support structure. Disposed between the exterior member and the underlying support structure is an arrangement of one or more inflatable cushions in fluid communication with one or more gas emitting inflators. Upon receipt of an activation signal from a sensor, inflation gas is introduced into the cushion which inflates outwardly away from the underlying support structure thereby causing a corresponding outward deformation of the exterior hood structure. If desired, the arrangement of gas accepting cushions may be such that the inflated expansion provides a degree of coverage across surfaces of the vehicle outboard of the exterior hood member. An arrangement of one or more extensible tethering elements preferably limits the degree of outward expansion of the exterior portion of the hood. The forced outward movement of the exterior portion of the hood assembly gives rise to an extended surface profile thereby leading to an enhanced ability on the part of the hood assembly to absorb energy through collapsible deformation upon impact by a pedestrian or other foreign body.

According to an aspect of the present invention it is contemplated that a plurality of inflatable expansible cushions may be utilized so as to provide deformation forces across different portions of the hood assembly. Of course, a single inflatable cushion may also be utilized if desired.

According to another aspect of the present invention, it is contemplated that one or more of the expansible cushions utilized may be configured to expand to positions outboard of the exterior hood surface upon inflation thereby providing inflated coverage across regions such as the windshield, the scuttle area directly beneath the windshield, the forward pillar structures adjacent to the windshield and the fenders disposed along the sides of the hood assembly. Of course, it is also contemplated that the inflatable cushion may remain entirely beneath the exterior hood surface if desired.

BRIEF DESCRIPTION OF THE DRAWINGS

The accompanying drawings, which are incorporated in and which constitute a part of this specification, illustrate exemplary embodiments of the invention and, together with the general description given above and the detailed description of the illustrated embodiments given below, serve to explain the principles of the present invention through reference to such drawings in which:

FIG. 1 is an exploded perspective view of the front end of an automotive vehicle including a hood assembly of displaceable character;

FIG. 2 is an assembled view of the automotive vehicle illustrated in FIG. 1 upon inflated deployment of the hood assembly;

FIG. 3 illustrates an exemplary extensible tether for use in the hood assembly prior to deployment;

FIG. 4 is a view similar to FIG. 3 illustrating the extensible tether following deployment;

FIG. 5 is an elevation plan view of an exemplary inflatable cushion element for use in deployment away from a position along the rear of the hood assembly and over the scuttle area and windshield; and FIG. 6 is an elevation plan view of an inflatable cushion element for disposition beneath the exterior of the hood assembly in adjacent relation to the fenders of the automobile.

While the invention has been generally described above and will hereinafter be described in connection with various illustrated embodiments, it is to be understood that in no event is the invention to be limited to such illustrated and described embodiments. On the contrary, it is intended that the present invention shall extend to all embodiments including all alternative and modifications as may embrace the principles of this invention within the true spirit and scope thereof.

DESCRIPTION OF THE PREFERRED EMBODIMENT

Reference will now be made to the drawings wherein to the extent possible like reference numerals are used to designate like components throughout the various views. In FIG. 1 there is illustrated an automotive vehicle 10 including a passenger compartment 12 for housing one or more occupants (not shown). The vehicle 10 also includes a forward body portion designated generally as 14 which extends in leading relation away from the passenger compartment 12 towards a front bumper 16. At the interior of the forward body portion 14 is a storage compartment 18 which may be used to house an engine or the like.

As illustrated in exploded perspective view, a hood assembly is disposed in overlying relation to the storage compartment 18. According to the illustrated arrangement, the hood assembly includes an interior support frame 22 such as a framework of structural metal strut members, a stamped metal plate structure with integral strengthening ribs or the like disposed in overlying relation to the storage compartment. As will be appreciated, the interior support frame may be covered across its underside by a insulating material such as a molded non-woven textile or the like as will be well known to those of skill in the art so as to dampen noise and vibration from underlying engine components.

In the illustrated embodiment, disposed at a position above the interior support frame 22 is a reaction plate member 24. The reaction plate member is preferably formed of thin gauge steel, aluminum or other metal, although other materials such as fiberglass, plastic or the like may also be used if desired. The reaction plate member 24 provides a substantially uniform reaction surface across the interior support frame 22 during inflation of an overlying cushion assembly 26 in a manner to be described further hereinafter. It is contemplated that the reaction plate member 24 may be eliminated in the event that the interior support frame 22 is of either a solid configuration without internal openings or otherwise provides a substantially uniform support surface for reaction against the overlying air bag assembly 26.

According to the illustrated embodiment, the air bag assembly 26 includes a first cushion element 28 and a second cushion element 30 in fluid communication with one another through a translation conduit 32. In the illustrated and potentially preferred embodiment, the first cushion element 28 and the second cushion element 30 may be inflated by inflation gas transmitted through a common gas receiver 34 in fluid communication with one or more inflators 36 which may be stored at convenient locations within the vehicle 10. The gas receiver 34 may be of a simple configuration such as a box structure having one or more inlets and a common outlet feeding into the air bag assembly 26. While the first cushion element 28 and the second cushion element 30 are illustrated as being interconnected and being inflated from a common gas source, it is likewise contemplated that the first cushion element 28 and the second cushion element 30 may be separate from one another and linked to one or more dedicated inflators if desired.

In the illustrated embodiment, the first cushion element 28 is normally stored below the windshield 15 at a generally rearward location of the forward body portion 14. Upon inflation, the first cushion element 28 is projected outwardly across the so-called scuttle area between the windshield 15 and the hood assembly so as to at least partially cover the scuttle area and the windshield 15 as shown in FIG. 2. In the illustrated embodiment, the second cushion element 30 is configured so as to inflate across an interior portion of the reaction plate member 24 in a forward relation relative to the first cushion element 28. It is contemplated that the width of the second cushion element 30 may be such that upon inflation portions of the second cushion element 30 may project outwardly in at least partial covering relation to portions of the fenders of the vehicle 10.

By way of example only, and not limitation, exemplary constructions of the first cushion element 28 and the second cushion element 30 are illustrated in FIGS. 5 and 6 respectively. Referring simultaneously to FIGS. 2 and 5, according to the illustrated exemplary embodiment the first cushion element 28 includes a generally concave upper edge 40 which is projected upwardly across the windshield 15 so as to provide enhanced coverage at the lateral sides of the windshield 15 along the forward structural pillars 42. Inflation gas is introduced through a mouth opening 44 in sealed relation with the conduit 32 as illustrated in FIG. 1. It is contemplated that the first cushion element 28 may be of a sewn construction formed from panels of textile material adjoined along perimeter edges by perimeter seams 45 such as sewn seams, welded seams such as RF (radio frequency), ultrasonic welded seams, and the like. It is likewise contemplated that the panels of material forming the first cushion element 28 may be adjoined to one another in a pattern at the interior of the first cushion element 28 so as to form a pattern of zero length tethers 46 which limit the expansion of the first cushion element 28 at the interior. It is contemplated that by limiting the expansion of the first cushion element 28 an enhanced area of coverage may be provided. That is, the presence of the zero length tethers 46 may offset the tendency of the first cushion element 28 to inflate outwardly away from the windshield thereby allowing the first cushion element 28 to expand laterally across the width of the windshield 15 in a more efficient manner. Thus, a more controlled expanded profile may be attained. If desired, venting elements 50 may be disposed at selected locations across the first cushion element 28 so as to allow for the controlled dissipation of inflation gas upon impact by a person or other structure. While the first cushion element 28 is illustrated as being formed from two panels of material adjoined completely around the perimeter, it is likewise contemplated that such a structure may be formed from a single panel of material which is folded upon itself and sealed around the open edges.

Referring to FIG. 6, it may be seen that the second cushion element 30 may include a mouth opening 54 for introduction of inflation gas from the gas receiver 34 as shown in FIG. 1. As with the first cushion element, the second cushion element 30 may be formed from panels of materials such as textile fabrics, films, and the like which are joined together by perimeter seams 55 such as sewn seams, welded seams including RF welded seams and/or ultrasonic welded seams and the like. A pattern of zero length tethers 56 may be disposed across the interior of the second cushion element 30 thereby joining the panels of material forming the second cushion element 30 together at the location of such zero length tethers 56. The presence of such zero length tethers 56 offsets the natural tendency of the cushion element to inflate in a bulbous manner thereby permitting extended coverage across the reaction plate member 24 towards the interior of the forward body portion 14. As can be seen, the second cushion element 30 preferably projects away from the windshield 15 towards the front bumper 16. While the second cushion element 30 may extend across substantially the entire forward body portion 14, it is likewise contemplated that the second cushion element 30 may project across a diminished portion of the forward body portion 14 if desired. While the second cushion element 28 is illustrated as being formed from two panels of material adjoined completely around the perimeter, it is likewise contemplated that such a structure may be formed from a single panel of material which is folded upon itself and sealed around the open edges.

In operation, the presence of the cushion elements 28, 30 above the interior support frame 22 causes the exterior show surface member 60 to be forced upwardly away from the interior support frame 22 upon the inflation of the cushion elements (FIG. 2). The outward projection of the exterior show surface member 60 gives rise to an energy absorbing impact surface which may engage a pedestrian thrown upon the hood during a collision event.

It is contemplated that the exterior show surface member 60 will preferably maintain some degree of attachment relative to the interior support frame 22 following outward expansion. Maintaining such attachment is believed to aid in the development of a defined impact surface across the show surface member 60 during activation and reduces the chance of the show surface member being lost.

According to one contemplated practice, the exterior show surface member 60 may be operatively connected to the interior support frame 22 by one or more extensible tether elements 70 which extend to a controlled degree upon the application of tension as force is generated across the exterior show surface member 60 by the cushion elements 28, 30. One embodiment of an extensible tether element 70 is illustrated in FIGS. 3 and 4.

In the illustrated assembly the extensible tether element 70 is constructed from an upper tether plate 72 and a lower tether plate 74. The upper tether plate 72 and the lower tether plate 74 are fixedly adjoined to one another at their ends by spot welds 76 or other attachment structures such as screws, bolts, and the like. An attachment element 78 such as a screw, bolt, snap attachment or the like extends away from the lower tether plate 74 for secure attachment relative to the interior support frame 22. As illustrated, the attachment element 78 is located inboard of the spot welds 76 and does not engage the upper tether plate 72. While the lower tether plate 74 is held in fixed relation to the interior support frame 22 by the attachment element 78, the upper tether plate 72 is operatively connected to the exterior show surface member 60 by an interior spot weld 80 which is preferably disposed in substantially opposing relation to the attachment element 78. Thus, upon the application of pressure across the exterior show surface member 60 by the inflating cushion elements 28, 30 the upper tether plates 72 and lower tether plate 74 may be pulled apart until separation is stopped by the spot weld 76. It is contemplated that the degree of separation may be controlled by controlling the distance between the spot welds 76. That is, a greater distance between the spot weld 76 will permit a greater degree of extension.

In practice it is contemplated that one or both of the tether plates may be formed from a plastically deformable material such as steel, aluminum or other metal or the like such that the extensible tether element will maintain its shape after elongation. That is, once the plates have been deformed they will hold their configuration until an adequate collapsing force is applied to restore the initial configuration. Such structural integrity following deformation may be beneficial in holding the exterior show surface away from the underlying frame until such time as it collapses under the force of impact by a pedestrian or other object outside the vehicle.

In order to avoid introducing any markings across the exterior of the show surface member 60, it is contemplated that an interior carrier member 82 of metal, plastic, or the like may be glued or otherwise adhered to the bottom of the exterior show surface member 60. The extensible tether element 70 may thereafter be welded or otherwise secured to the interior carrier member 82 such as by welding the upper tether plate 72 to the bottom of the interior carrier member 82 at the interior spot weld 80. Through use of the interior carrier member 82 at the intermediate location between the extensible tether element 70 and the exterior show surface member 60, the desired operative connection may be achieved without giving rise to any attachment markings across the exterior show surface member 60.

As will be appreciated, it is contemplated that the extensible tether element 70 will be located at a position so as to not interfere with the extension of the cushion elements 28, 30. In one contemplated arrangement, a series of extensible tether elements 70 is arranged at a position immediately over the intersection between the first cushion element 28 and the second cushion element 30 so as to permit the attachment elements 78 to pass immediately behind the rear edge of the second cushion element 30 and through the reaction plate member 24 for attachment at the interior support frame 22.

In operation, an actual or impending impact with a person or exterior object may be sensed by one or more sensors 86. The sensors 86 thereafter transmit an activation signal to the inflators 36 resulting in the generation of a high pressure inflation gas which is transmitted into the cushion elements 28, 30 which make up the air bag assembly 26. As the inflation gas enters the cushion elements 28, 30 the cushion elements are forced into an expanded configuration thereby causing the first cushion element 28 to expand outwardly from beneath the rear of the exterior show surface member 60 and across the windshield 15. Simultaneously, the second cushion element 30 expands beneath the exterior show surface member 60 while being supported by the reaction plate member 24. Thus, the expansion force is translated to the exterior show surface member 60 so as to cause the exterior show surface member 60 project outwardly away from the underlying interior support frame 22. However, this outward projection is nonetheless limited by the presence of one or more expansible tether elements 70 which maintain an operative connection between the interior support frame 22 and the exterior show surface member 60. The exterior show surface member 60 is thereafter held in a raised energy absorbing condition by the expanded cushion elements in combination with the plastically deformed tether elements 70.

Of course, it is contemplated that the present invention may be the subject of any number of variations. By way of example only, and not limitation, it is contemplated that the first cushion element 28 and second cushion element 30 may be operated independently of one another. Likewise, it is contemplated that either the first cushion element 28 or the second cushion element 30 may be eliminated entirely such that the assembly incorporates only a single cushion element if desired. Of course, it is contemplated that any number of other modifications and variations embodying the principles of this invention will no doubt occur to those of skill in the art. It is therefore contemplated and intended that the present invention shall extend to all such modifications and variations as may incorporate the broad principles of the invention herein within the full spirit and scope thereof.

What is claimed is:

1. An automobile hood assembly for disposition in overlying relation to a vehicle storage compartment in an automotive vehicle, the hood assembly comprising:
    an exterior show surface member;
    a support frame disposed at a position below the exterior show surface member;
    at least one plastically deformable extensible tether element operatively connecting the exterior show surface member and the support frame; and
    an air bag assembly comprising at least one inflatable air bag cushion disposed intermediate the support frame and the exterior show surface member, wherein said at least one inflatable air bag cushion is in fluid communication with at least one selectively activatable gas emitting inflator, such that said at least one selectively activatable gas emitting inflator directs inflation gas into said at least one inflatable air bag cushion and said at least one inflatable air bag cushion inflates to an expanded profile such that at least a portion of the exterior show surface member is thereby projected away from the support frame to define an energy absorbing impact surface and wherein said at least one plastically deformable extensible tether element is plastically deformed to an increased operative length as the exterior show surface member is projected away from the support frame such that said at least one plastically deformable extensible tether element thereafter supports the exterior show surface member at an elevated position relative to the support frame while maintaining an operative connection between the support frame and the exterior show surface member.

2. The automobile hood assembly according to claim 1, wherein the air bag assembly comprises a first air bag cushion adapted to be inflatably deployed from beneath the exterior show surface member at least partially across a windshield disposed rearward of the exterior show surface member and at least a second air bag cushion adapted to be inflatably deployed across a region substantially beneath the exterior show surface member.

3. The automobile hood assembly according to claim 2, wherein the first air bag cushion has a substantially concave upper edge.

4. The automobile hood assembly according to claim 3, wherein the first air bag cushion comprises a textile material.

5. The automobile hood assembly according to claim 2, wherein the second air bag cushion has an inflated width greater than the exterior show surface member such that upon inflation lateral sides of the second air bag cushion project outwardly at least partially across adjacent fender portions of the automotive vehicle.

6. The automobile hood assembly according to claim 5, wherein the second air bag cushion comprises a textile material.

7. The automobile hood assembly according to claim 1, further comprising a carrier member secured to an underside surface of the exterior show surface member, wherein the carrier member defines an attachment surface for said at least one plastic ally deformable tether element.

8. The automobile hood assembly according to claim 1, wherein the tether element comprises an upper plate member and a lower plate member and wherein the upper plate member and the lower plate member are attached to one another at spaced apart attachment points such that the upper plate member is displaceable from the lower plate member along regions between said spaced apart attachment points and wherein the upper plate member is operatively connected to the exterior show surface member at a first intermediate attachment point disposed between said spaced apart attachment points and wherein the lower plate member is secured in substantially fixed relation to the support frame by an attachment member disposed between said spaced apart attachment points such that upon movement of the exterior show surface member away from the support frame the upper plate member is separated from the lower plate member along a region between said spaced apart attachment points and at least one of the lower plate member and the upper plate member undergoes plastic deformation during such separation.

9. The automobile hood assembly according to claim 8, wherein at least one of the upper plate member and the lower plate member comprises a metal.

10. The automobile hood assembly according to claim 9, wherein said metal is selected from the group consisting of steel and aluminum.

11. An automobile hood assembly for disposition in overlying relation to a vehicle storage compartment in an automotive vehicle, the hood assembly comprising:
    an exterior show surface member;
    a support frame disposed at a position below the exterior show surface member;
    a plurality of plastically deformable extensible tether elements operatively connecting the exterior show surface member and the support frame; and
    an air bag assembly comprising a first air bag cushion adapted to be inflatably deployed from beneath the exterior show surface member at least partially across a windshield disposed rearward of the exterior show surface member and at least a second air bag cushion adapted to be inflatably deployed across a region substantially beneath the exterior show surface member wherein said first air bag cushion and said second air bag cushion are disposed in fluid communication with one another and with at least one selectively activatable gas emitting inflator, such that said at least one selectively activatable gas emitting inflator directs inflation gas into both said first air bag cushion and said second air bag cushion such that at upon activation of said at least one selectively activatable gas emitting inflator, said first air bag cushion and said second air bag cushion are inflated to expanded conditions and at least a portion of the exterior show surface member is projected away from the support frame to define an energy absorbing impact surface and wherein said plastically deformable extensible tether elements are plastically deformed to an increased operative length as the exterior show surface member is projected away from the support frame such that said plastically deformable extensible tether elements thereafter support the exterior show surface member at an elevated position relative to the support frame while maintaining an operative connection between the support frame and the exterior show surface member.

12. The automobile hood assembly according to claim 11, wherein the first air bag cushion has a substantially concave upper edge.

13. The automobile hood assembly according to claim 12, wherein the first air bag cushion comprises a textile material.

14. The automobile hood assembly according to claim 11, wherein the second air bag cushion has an inflated width greater than the exterior show surface member such that upon inflation lateral sides of the second air bag cushion project outwardly at least partially across adjacent fender portions of the automotive vehicle.

15. The automobile hood assembly according to claim 14, wherein the second air bag cushion comprises a textile material.

16. The automobile hood assembly according to claim 11, further comprising a carrier member secured to an underside surface of the exterior show surface member, wherein the carrier member defines an attachment surface for said plastically deformable tether elements.

17. The automobile hood assembly according to claim 16, wherein at least a portion of said plastically deformable tether elements comprise an upper plate member and a lower plate member and wherein the upper plate member and the lower plate member are attached to one another at spaced apart attachment points such that the upper plate member is displaceable from the lower plate member along regions between said spaced apart attachment points and wherein the upper plate member is secured in substantially fixed relation to the carrier member at an intermediate attachment point disposed between said spaced apart attachment points and wherein the lower plate member is secured in substantially fixed relation to the support frame by an attachment member disposed between said spaced apart attachment points such that upon movement of the exterior show surface member away from the support frame the upper plate member is separated from the lower plate member along a region between said spaced apart attachment points and at least one of the lower plate member and the upper plate member undergoes plastic deformation during such separation.

18. The automobile hood assembly according to claim 17, wherein at least one of the upper plate member and the lower plate member comprises a metal.

19. The automobile hood assembly according to claim 18, wherein said metal is selected from the group consisting of steel and aluminum.

20. An automobile hood assembly for disposition in overlying relation to a vehicle storage compartment in an automotive vehicle, the hood assembly comprising:

an exterior show surface member;

a carrier member secured to an underside surface of the exterior show surface member;

a support frame disposed at a position below the exterior show surface member;

a plurality of plastically deformable extensible tether elements secured to the carrier member so as to operatively connect the exterior show surface member and the support frame; and an air bag assembly comprising a first air bag cushion adapted to be inflatably deployed from beneath the exterior show surface member at least partially across a windshield disposed rearward of the exterior show surface member and at least a second air bag cushion adapted to be inflatably deployed across a region substantially beneath the exterior show surface member wherein said first air bag cushion and said second air bag cushion are disposed in fluid communication with at least one selectively activatable gas emitting inflator, such that at upon activation of said at least one selectively activatable gas emitting inflator, said first air bag cushion and said second air bag cushion are inflated to expanded conditions and at least a portion of the exterior show surface member is projected away from the support frame to define an energy absorbing impact surface and wherein said plastically deformable extensible tether elements are plastically deformed to an increased operative length as the exterior show surface member is projected away from the support frame such that said plastically deformable extensible tether elements thereafter support the exterior show surface member at an elevated position relative to the support frame while maintaining an operative connection between the support frame and the exterior show surface member and wherein at least a portion of said plastically deformable tether elements comprise an upper plate member and a lower plate member and wherein the upper plate member and the lower plate member are attached to one another at spaced apart attachment points such that the upper plate member is displaceable from the lower plate member along regions between said spaced apart attachment points and wherein the upper plate member is secured in substantially fixed relation relative to the carrier member at a first intermediate attachment location disposed between said spaced apart attachment points and wherein the lower plate member is secured in substantially fixed relation relative to the support frame at a second intermediate attachment location disposed between said spaced apart attachment points such that upon movement of the exterior show surface member away from the support frame the upper plate member is separated from the lower plate member along a region between said spaced apart attachment points and at least one of the lower plate member and the upper plate member undergoes plastic deformation during such separation.

21. The automobile hood assembly according to claim 20, wherein said first air bag cushion is disposed in fluid communication with said second air bag cushion such that said first air bag cushion and said second air bag cushion are inflatable by a single common inflator.

* * * * *